US008254897B2

(12) United States Patent
Zhou et al.

(10) Patent No.: US 8,254,897 B2
(45) Date of Patent: *Aug. 28, 2012

(54) OFF-HOOK TRIGGERED CELLULAR-LANDLINE CONFERENCE CALL

(75) Inventors: Tong Zhou, Overland Park, KS (US); Jiongkuan Hou, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 13/275,007

(22) Filed: Oct. 17, 2011

(65) Prior Publication Data

US 2012/0034914 A1 Feb. 9, 2012

Related U.S. Application Data

(63) Continuation of application No. 11/750,805, filed on May 18, 2007, now Pat. No. 8,064,892.

(51) Int. Cl.
*H01Q 11/12* (2006.01)

(52) U.S. Cl. .................... 455/416; 455/426.2; 455/74.1; 379/204.01; 370/356

(58) Field of Classification Search ............... 455/552.1, 455/426.1, 445, 411, 405, 464, 560, 417, 455/410, 426.2; 370/346, 349, 337, 209, 370/401; 380/247; 379/37, 40; 714/748
See application file for complete search history.

(56) References Cited

U.S. PATENT DOCUMENTS

| | | | | |
|---|---|---|---|---|
| 5,511,110 | A | 4/1996 | Drucker | |
| 5,963,864 | A * | 10/1999 | O'Neil et al. | 455/445 |
| 6,044,267 | A * | 3/2000 | Foladare et al. | 455/426.1 |
| 6,714,635 | B1 * | 3/2004 | Adams et al. | 379/204.01 |
| 6,718,178 | B1 * | 4/2004 | Sladek et al. | 455/466 |
| 7,565,115 | B2 * | 7/2009 | Alexis | 455/74.1 |
| 7,764,960 | B2 * | 7/2010 | McClung | 455/426.1 |
| 7,769,146 | B1 * | 8/2010 | Weaver et al. | 379/88.17 |
| 8,064,892 | B1 * | 11/2011 | Zhou et al. | 455/416 |
| 2003/0185369 | A1 | 10/2003 | Oliver et al. | |
| 2004/0008636 | A1 | 1/2004 | Alexis | |
| 2004/0072544 | A1 * | 4/2004 | Alexis | 455/74.1 |
| 2004/0092252 | A1 * | 5/2004 | Gustavsson et al. | 455/412.2 |
| 2004/0131167 | A1 * | 7/2004 | Chang et al. | 379/202.01 |
| 2004/0132500 | A1 * | 7/2004 | Rogalski et al. | 455/569.1 |
| 2004/0203680 | A1 * | 10/2004 | Sylvain | 455/417 |
| 2005/0197061 | A1 * | 9/2005 | Hundal | 455/41.2 |
| 2006/0193301 | A1 | 8/2006 | Cheng et al. | |
| 2006/0227964 | A1 | 10/2006 | Gierach et al. | |
| 2007/0036098 | A1 | 2/2007 | Jain et al. | |
| 2007/0189482 | A1 | 8/2007 | Erb | |
| 2007/0286098 | A1 | 12/2007 | Combs et al. | |

FOREIGN PATENT DOCUMENTS

EP 1814295 8/2007

* cited by examiner

*Primary Examiner* — Jean A Gelin
*Assistant Examiner* — Mahendra Patel

(57) ABSTRACT

A method and system for conferencing a landline telephone into a cellular telephone call is disclosed. In response to a landline telephone going off-hook, a cellular telephone corresponding to the landline telephone is identified. When a determination is made that the corresponding cellular telephone is currently engaged in a call, the landline telephone is conferenced into the cellular call. If the cellular telephone is subsequently disengaged from the call, the original cellular call has been effectively transferred to the landline telephone. The inventive method and system may be linked to a cellular-landline conference call service. For example, a user may subscribe to such a service so that the user may automatically transfer a call from the user's cellular telephone to the user's home or office landline telephone when that landline telephone is taken off-hook.

20 Claims, 2 Drawing Sheets

OFF-HOOK TRIGGERED CELLULAR-LANDLINE CONFERENCE CALL

REFERENCE TO RELATED APPLICATION

This is a continuation of U.S. application Ser. No. 11/750,805, filed on May 18, 2007, the entirety of which is hereby incorporated by reference.

FIELD OF THE INVENTION

The present invention relates to telecommunications, and more particularly to management of call sessions.

BACKGROUND

In a basic landline telephone system, a given customer's premises are connected to a telephone company switching office by a local loop telephone line, which provides the customer's premises with connectivity to the public switched telephone network, among possibly other services. At the customer's premises, the telephone line then may then couple with a local network that connects the telephone line to numerous telephones (as well as other telephony equipment such as fax machines, DSL modems, answering machines, etc.) With this arrangement, the customer can conveniently engage in a telephone call using any of the telephones at the customer's premises.

One benefit of having numerous telephones on the customer premises network is that a user can readily transfer a call from one customer premises telephone to another. One way to do so is to simply engage a "hold" function on the telephone currently in use and then pick up the call at the other telephone. Another way to do so is to pick up the other telephone so as to join it into the existing call and to then hang up the first telephone.

In advanced PBX systems of the type commonly found in most business offices, mechanisms are also provided to facilitate transfer of a call from one telephone to another. In a PBX system, a PBX server typically connects various customer premises telephones with the public switched telephone network, through a dedicated circuit connection to each telephone or over a packet-switched network connection (in an IP PBX system). To transfer an existing call from one PBX telephone to another, a user at the first PBX telephone may engage a "transfer" function on the telephone and dial the extension of the other telephone. The PBX server may then hold the call (possibly allowing the user to hang up the first telephone) and may connect the call to the other telephone when a user answers the other telephone.

Alternatively, a PBX system may provide a "pick" function that allows call transfer at the request of the target telephone. In particular, a user of one telephone may place a call on hold, and a user of another telephone may then pick up that call by engaging a "pick" function and dialing the extension of the first telephone. The pick function makes it easy for a user to move from one telephone to another, by putting the call on hold at the first telephone and then moving to the other telephone and picking up the call at the other telephone.

SUMMARY

While the foregoing mechanisms make it easy for a user to transfer a call between telephones that are both connected to the same customer premises network, the mechanisms do not allow for convenient transfer of calls between telephones that are not part of the same customer premises network.

One particular disadvantage of these mechanisms is that they do not allow for convenient transfer of a call between a cellular telephone and a landline telephone. Given the widespread popularity of cellular telephony, it would be especially useful if a user could readily transfer an ongoing call from a cellular telephone to a landline telephone. In particular, if a user is engaged in a cellular telephone call and enters the user's home or office, it would be nice if the user could readily transfer the ongoing call from the user's cellular telephone to a landline telephone at that home or office.

The present invention allows for such a transfer by providing a mechanism for a user to conference a landline telephone into an existing cellular telephone call. According to an exemplary embodiment of the invention, when a user takes a landline telephone off hook (i.e., picks up the telephone), a switch or other network entity serving the landline telephone will detect the off-hook status and will responsively invoke a process of conferencing the landline telephone into an existing cellular call. The cellular telephone may then be disengaged from the call, effectively transferring the call from the cellular telephone to the landline telephone.

According to a preferred embodiment of the invention, a network system will be pre-provisioned with data that correlates the landline telephone with the cellular telephone, such as by simply correlating the landline telephone number with the cellular telephone number. When the user takes the landline telephone off hook, the network system will first check a subscription profile for the landline telephone to determine whether a subscription to the present cellular-landline conference call service is in place.

If the landline telephone subscribes to the cellular-landline conference call service, the network system will identify the cellular telephone corresponding with the landline telephone and will determine whether the cellular telephone is currently engaged in a call. If so, the network system will then engage in a process to connect the landline telephone with the existing call, and perhaps to disconnect the cellular telephone from the call. As a result, the user who took the landline telephone off hook can continue the call in which the cellular telephone was engaged.

To facilitate the conference call functionality, the network system may maintain call-state data for tracking the call state of one or more telephone devices, including the cellular telephone. In practice, the network system may keep the call-state data up to date by receiving messages indicating when telephones start and stop calls and updating the database accordingly. For instance, the network system may receive a message notifying the network system that the cellular telephone is currently engaged in a call; the network system may then responsively update the call state of the cellular telephone in the call-state data to indicate that the cellular telephone is busy. When the cellular telephone subsequently disengages from the call, the network system may receive a similar notification message, and the network system may then responsively update the call state of the cellular telephone in the call-state data to indicate that the cellular telephone is idle.

One potential drawback of this conferencing process is that the process could enable a user of a landline telephone to participate in a cellular telephone call without permission or without any knowledge on the part of the cellular telephone user. To overcome this problem, in a further aspect of the preferred embodiment, the network system that carries out the invention can send an alert to the cellular telephone when the cellular-landline conference call function is being invoked. This alert could take the form of a distinct tone or recorded voice announcement audible to the user of the cellular telephone.

Additionally, this embodiment allows for the user of the cellular telephone to disallow the conference call. If the user of the cellular telephone, after hearing the alert, does not want the landline telephone to participate in the call, the user could send a message to the network system. (This message could take the form of a feature code dialed by the user of the cellular telephone, for example.) Responsive to the message, the network system could abort the call conferencing process. Alternatively, if the landline telephone had already been conferenced into the call at the time the network system received the message from the cellular telephone, the network system could responsively disengage the landline telephone from the call while leaving the call intact between the cellular phone and the remote party that was in the call originally.

Yet another potential drawback of this process is that, when a user takes the landline telephone off hook, the user may not want to invoke the cellular-landline conference call function. Rather, the user may simply want to place a call with the landline telephone. To account for this possibility, in another aspect of the preferred embodiment, the network system may be arranged to detect if a user of the landline telephone begins dialing a number and to responsively abort the conferencing process.

In still a further aspect, the network system that applies this invention may be arranged to hold off on delivering an initial dial tone to the landline telephone until the system determines whether or not to apply the cellular-landline call conferencing process. Thus, when the user takes the landline telephone off hook, the network system may quickly make the determination of whether the landline telephone subscribes to the cellular-landline conference call service. If not, the network system may then provide the conventional dial tone to the landline telephone, and the user of the landline telephone may proceed as normal to place a call. On the other hand, if the network system determines that the landline telephone subscribes to the cellular-landline conference call service, then the network system may provide no dial tone to the landline telephone or may provide the landline telephone with a distinct dial tone, in either case indicating to the user of the landline telephone that the inventive process is being applied. Still at any point during this process, the user of the landline telephone may abort the conferencing process by simply beginning to dial an outbound call as described above.

In one respect, an exemplary embodiment of the present invention may thus take the form of a call conferencing method. The exemplary method may include detecting the transition of a landline telephone from an on-hook state to an off-hook state at a time when a call alert signal is not being sent to the landline telephone (i.e., when the landline telephone is not receiving an incoming call). In turn, the method may responsively involve (i) identifying a cellular telephone corresponding with the landline telephone and (ii) determining whether the cellular telephone is currently engaged in a call. Responsive to the determination that the cellular telephone is currently engaged in a call, the method may then involve engaging in a process to conference the landline telephone into the call.

In another respect, the exemplary embodiment may take the form of a cellular-landline call conference system. Such a system may include a landline telephone system operative to serve a landline telephone, and a cellular telephone system operative to serve a cellular telephone. Such a system may further include a transport network communicatively linked with both the landline telephone system and the cellular telephone system, such that when the cellular telephone is engaged in a call via the cellular telephone system, the call extends through the transport network, and when the landline telephone is engaged in a call via the landline telephone system, the call extends through the transport network.

The system may additionally include a service controller containing conference call application logic, and the conference call application logic may operate to receive a signal indicating that the landline telephone transitioned to an off-hook state. The conference call application logic may responsively operate to recognize that the cellular telephone corresponds with the landline telephone and to determine whether the cellular telephone is currently engaged in a call. Responsive to the determination that the cellular telephone is currently engaged in a call, the conference call application logic may further operate to engage in a process to conference the landline telephone into the call.

In a third aspect, the exemplary embodiment may take the form of a call conferencing method. This method may include a first switch—serving a landline telephone—detecting the transition of the landline telephone from an on-hook state to an off-hook state at a time when the first switch is not sending a call alert to the landline telephone. The method may then include the first switch sending a first message to a service controller, such that the first message indicates the off-hook state of the landline telephone.

The method may then involve the service controller responsively identifying a cellular telephone corresponding with the landline telephone and determining whether the cellular telephone is currently engaged in a first call. Responsive to a determination that the cellular telephone is currently engaged in a first call with a remote party, the method may further involve the service controller sending a second message to the first switch, such that the second message directs that a second call be set up between the landline telephone and the cellular telephone. Responsive to the second message, the method may then involve the first switch engaging in call setup signaling with a second switch that serves the cellular telephone to set up the second call.

Responsive to the call setup signaling, the method may also involve the second switch sending a third message to the service controller, the third message indicating an attempt to set up the second call. In response to the third message, the service controller may then send a fourth message to the second switch, with the fourth message instructing the second switch to join the landline telephone into the first call between the cellular phone and the remote party. Responsive to the fourth message, the second switch may then signal to the first switch to complete the set up of the second call between the cellular telephone and the landline telephone such that the second call gets joined together with the first call between the cellular telephone and the remote party.

These as well as other aspects, advantages and alternatives will become apparent to those of ordinary skill in the art by reading the following detailed description, with reference where appropriate to the accompanying drawings.

DETAILED DESCRIPTION OF THE DRAWINGS

Exemplary Architecture

Figure 1:
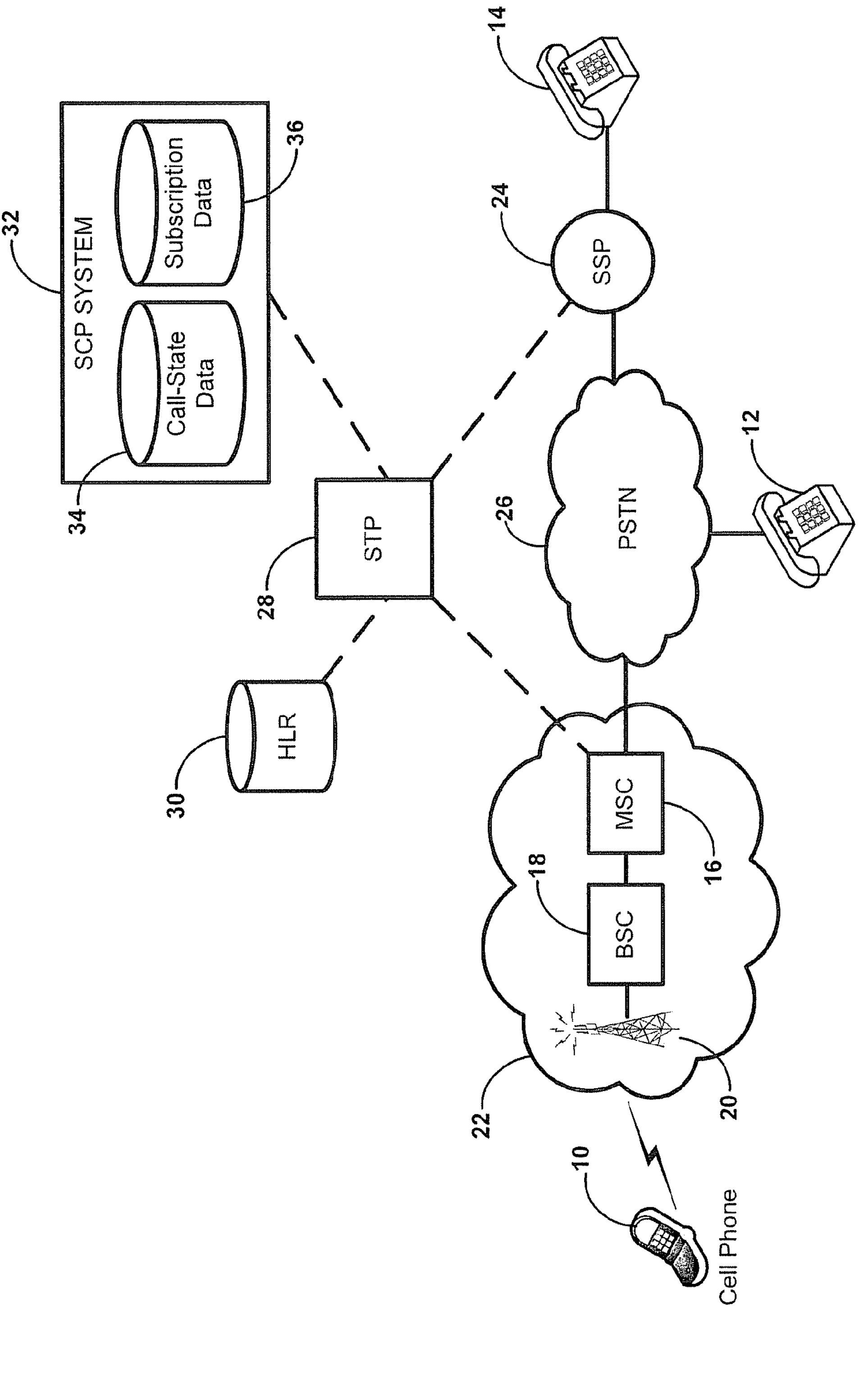
FIG. 1 shows a simplified block diagram of a network arrangement in which an embodiment of the invention can be implemented.

Referring to the drawings, FIG. 1 shows an exemplary network arrangement in which an embodiment of the invention can be implemented. Specifically, FIG. 1 shows a typical network arrangement that would accommodate a telephone call between a cellular telephone and a landline telephone.

It should be understood that FIG. 1 and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

Cellular telephone 10 communicates over radio access network (RAN) 22. RAN 22 may include a base transceiver station (BTS) 20, a base station controller (BSC) 18, and a mobile switching center (MSC) 16. BTS 20 may include a cell tower with one or more antennas that radiate to define an air interface in which cellular telephone 10 can operate. BSC 18 may control BTS 20 and various aspects of air interface communication. RAN 22 may be controlled by a switching entity such as MSC 16.

Landline telephone 14 is connected to public switched telephone network (PTSN) 26 via a switching entity such as service switching point (SSP) 24, of the type likely to serve a home telephone. In place of SSP 24, or in addition to SSP 24, landline telephone 14 could connect to PTSN 26 via a PBX server, of the type likely to serve an office telephone. Remote telephone 12 is also connected to PTSN 26. Further, MSC 16 is connected to PTSN 26 such that cellular telephone 10 can engage in calls with other entities connected to PTSN 26, such as telephones 12 and 14.

Both MSC 16 and SSP 24 are connected, via signaling pathways, to a signaling network comprising a signal transfer point (STP) 28. Signaling pathways also connect STP 28 to a home location register (HLR) 30, which contains profile information for cellular telephones, and service control point (SCP) system 32. Through STP 28, MSC 16 can send messages to and receive messages from HLR 30 and SCP system 32, and SSP 24 can send messages to and receive messages from SCP system 32.

SCP system 32 contains call-state data and subscription data. Call-state data 34 includes call-state information regarding one or more telephone devices, and subscription data 36 includes data indicating correlations between cellular telephones and landlines telephones and whether those telephones subscribe to the present cellular-landline conference call service. Subscription data 36 may be populated when a particular telephone user registers with a service provider and opts to subscribe to the cellular-landline conference call service. Alternatively, subscription data 36 may be updated when an existing telephone user signs up for the cellular-landline conference call service. SCP system 32 may include whatever processing and memory components are necessary to access, maintain, and edit call-state data 34 and subscription data 36. Accessing and editing of the data may occur with the exchange of messages between SCP system 32 and other network entities, and examples of such messages will be described in detail below. SCP system 32 may include one or more SCPs that are linked together.

Basic Call Setup

When one telephone device connected to PSTN 26 calls another telephone device connected to PTSN 26, the switches serving the respective telephone devices engage in call setup signaling to establish a voice channel over which the two devices can communicate. For instance, if landline telephone 14 places a call to cellular telephone 10, that call is routed through switch SSP 24. When a user takes landline telephone 14 off hook, a circuit is established between landline telephone 14 and SSP 24. Subsequently, as the user dials digits on landline telephone 14, SSP 24 detects that digit dialing. SSP 24 sends a call setup signal to STP 28, and STP 28 intelligently recognizes the dialed number as corresponding to MSC 16 and routes the signaling from SSP 24 to MSC 16.

To set up the call over PTSN 26, SSP 24 may conventionally engage in SS7 (Integrated Services Digital Network (ISDN) User Part, or "ISUP") signaling via STP 28 with MSC 16. SSP 24 may first send an ISUP "Initial Address Message" (IAM) via STP 28 to MSC 16. To acquire profile logic for cellular telephone 10, MSC 16 may receive a service profile for cellular telephone 10 from HLR 30, via the STP 28, or MSC 16 may use a previously stored local copy of that profile. Upon receipt of the ISUP IAM message, MSC 16 may apply profile logic to determine how the incoming call should be delivered to cellular telephone 10. For instance, to obtain call processing guidance, MSC 16 may send a query message via STP 28 to SCP system 32 or another entity. SCP system 32 may then apply service logic to decide how the call should be handled and send a call handling directive via STP 28 to MSC 16. MSC 16 may then carry out that directive.

In a normal case (absent some contrary directive), MSC 16 may page cellular telephone 10 over a paging channel on an air interface and may direct BSC 18 to assign a traffic channel through which cellular telephone 10 can communicate. When cellular telephone 10 answers the page, MSC 16 would then reserve a trunk through PTSN 26 for the call and send an ISUP "Address Complete Message" (ACM) via STP 28 to SSP 24, indicating the port/trunk reserved. SSP 24 would then connect the call through to that trunk and send a ringing tone to calling landline telephone 14. When called cellular telephone 10 answers, MSC 16 would in turn send an ISUP "Answer Message" (ANM) to SSP 24 to complete call setup, and the call would then commence.

Maintaining Call State

According to the inventive process, a landline telephone may be joined into in an existing cellular telephone call, and the conferencing process is preferably invoked only when the cellular telephone is engaged in call. It consumes system resources, like signaling pathways, to directly query a cellular telephone to determine if that cellular telephone is busy or idle. Therefore, the process can be implemented more efficiently if call-state information is centrally maintained by a network entity other than the cellular telephone itself. Given centrally maintained call-state information, the network would relay the typical call-state query (and any response to that query) through fewer network entities. To facilitate determination of whether cellular telephone 10 is currently engaged in a call, the call state of cellular telephone 10 is preferably maintained in call-state data 34 in SCP system 32.

To maintain the accuracy of call-state data 34, MSC 16 may engage in signaling with SCP system 32 regarding the call state of cellular telephone 10. When engaged in any type of call signaling—i.e., call set up or call release—on behalf of cellular telephone 10, MSC accesses the profile of cellular telephone 10. If the profile reflects that cellular telephone 10 subscribes to a cellular-landline conference call service, this indicates to MSC 16 that SCP system 32 should be kept abreast of the call state of cellular telephone 10.

During the set up of a call for cellular telephone 10, MSC 16 signals to SCP system 32 to indicate that cellular telephone 10 is now busy. SCP system 32 receives the message, which could take the form of an IS-771 ANLYZD message for instance, via STP 28. Responsive to the message, SCP system 32 may update call-state data 34 so that the call state of cellular telephone 10 is recorded as "busy." SCP system 32 may send a message to MSC 16 confirming that the call-state data has been updated, and this message could take the form of an IS-771 anlyzd_rr.

When a call in which cellular telephone 10 is engaged ends, MSC 16 either sends a release message to another network entity (such as another switch) or acknowledges the receipt of a release message. Again, the profile of cellular telephone 10 will reflect that SCP system 32 should be notified that the call has been released and the call state of cellular telephone 10 has changed. Accordingly, MSC 16 may send a message, perhaps another IS-771 ANLYZD message, to SCP system 32 to indicate that cellular telephone 10 is now idle. SCP system 32 may responsively update call-state data 34 to indicate that the call state of cellular telephone 10 is "idle." This update may be confirmed by a message, which could take the form of another IS-771 anlyzd_rr message, from SCP system 32 to MSC 16.

Exemplary Operation

Figure 2:
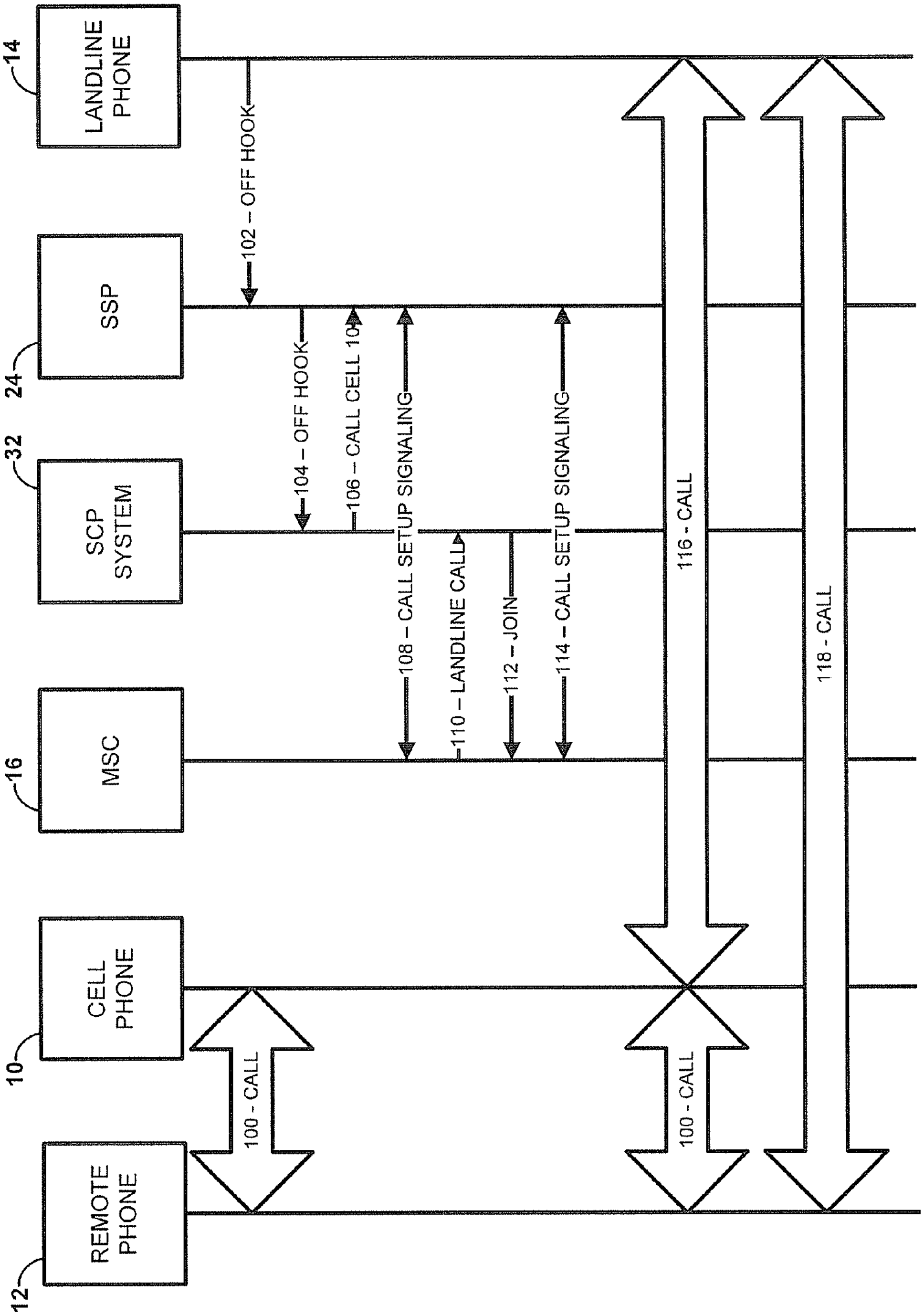
FIG. 2 is a message flow diagram depicting one embodiment of an exemplary method.

FIG. 2 is a message flow diagram showing an exemplary method, although FIG. 2 should not be taken as limiting the invention. The entities sending and receiving messages in FIG. 2 correspond to the entities with like reference numerals shown in FIG. 1. Messages could be added, deleted, combined, or changed without departing from the true scope and spirit of the invention.

This process begins with the assumption that cellular telephone 10 is engaged in a call 100 with remote party 12 and that the system has maintained call-state data 34 as described above. At step 102, landline telephone 14 is taken off hook, and SSP 24 detects the off-hook transition. When landline telephone 14 is taken off hook, this transition is not in response to a call alert, such as landline telephone 14 ringing. At step 104, SSP 24 responsively indicates the off-hook status of landline telephone 14 in a message to SCP system 32. In response to the message at step 104, SCP system 32 queries subscription data 36 to determine (i) that landline telephone 14 subscribes to the cellular-landline conference call service and (ii) that cellular telephone 10 is the corresponding cellular telephone line for the service. After determining that cellular telephone 10 corresponds to landline telephone 14, SCP system 32 queries call-state data 36 to determine that cellular telephone 10 is busy.

At this point, SCP system 32 has established that the situation is ripe for conferencing landline telephone 14 into call 100. Therefore at step 106, SCP system 32 sends a message to SSP 24, directing SSP 24 to initiate a call to cellular telephone 10. SSP 24 responsively engages in call set up signaling at step 108 with MSC 16. As described above, this call setup signaling may take the form of the SSP 24 sending an ISUP IAM message to MSC 16.

Profile logic from the profile of cellular telephone 10 may direct MSC 16 to query SCP system 32 for call treatment instructions upon receipt of an ISUP IAM message for a call to cellular telephone 10. At step 110, MSC 16 therefore sends a message to SCP system 32 indicating that cellular telephone 10 is receiving a call from landline telephone 14 and requesting call treatment instructions. This message could take the form of an IS-771 T BUSY message. Upon receipt of the message, SCP system 32 accesses subscription data 36 to determine that landline telephone 14 and cellular telephone 10 subscribe to the cellular-landline conference call service and that those two numbers correspond to each other. Responsive to those determinations, SCP system 32 then sends a message to MSC 16 at step 112 directing that landline telephone 14 be joined into the current call of cellular telephone 10. This message could be an IS-771 t_busy_rr_message.

To conference landline telephone 14 into call 100, MSC 16 again engages in further call setup signaling with SSP 24 at step 114. For instance, MSC 16 may send ISUP ACM and ANM messages to SSP 24. Step 114 results in a call 116 being established between cellular telephone 10 and landline telephone 14. Call 116 and call 100 are simultaneously connected to cellular telephone 10, creating a three-way call between remote telephone 12, cellular telephone 10, and landline telephone 14. In a preferred embodiment, cellular telephone 10 is automatically disengaged from the call, resulting in a call 118 between remote telephone 12 and landline telephone 14. Alternatively, the user of cellular telephone 10 could hang up to cause a transition to call 118. With the disengagement of cellular telephone 10, call 100 is effectively transferred from cellular telephone 10 to landline telephone 14.

Exemplary Alternatives

If the entire process to conference a landline telephone into a cellular telephone call is automatic, there exists the possibility that landline telephone 14 could participate in the call of cellular telephone 10 without the knowledge or consent of the user of cellular telephone 10. Therefore, in an alternate embodiment of the invention, in response to the message at step 112 directing that landline telephone 14 be joined to the call, MSC 16 may send an alert to cellular telephone 10 while engaging in setup signaling at step 114 for the conference call. This alert could take the form of an SMS message, a distinct audible tone, or even a voice recording announcing to the user of cellular telephone 10 that landline telephone 14 is joining the call. The alert notifies the user of cellular telephone 10 of a conference call.

Should the user of cellular telephone 10 want to disallow the conference call with landline telephone 14, the user of cellular telephone 10 may hang up and end the call. However, another alternate embodiment allows the user of cellular telephone to refuse the conference call without ending call 100. In response to the alert of the conference call, cellular telephone 10 can send a message to MSC 16 to abort the conference. For instance, the user may send an abort message by dialing a feature code on cellular telephone 10. Responsive to the abort message from cellular telephone 10, MSC 16 may signal to SSP 24 either to abort the call setup of step 114 or to end call 116 if the abort message was received after call 116 was connected.

Another alternate embodiment accounts for the possibility that the user of landline telephone 14 takes the telephone off hook to place a call normally, rather than to conference into the current call of cellular telephone 10. If SSP 24 detects digit dialing from landline telephone 14, SSP 24 may responsively signal to SCP system 32 or to MSC 16 to abort the conferencing process. This detecting and aborting functionality could be supported up until the point when landline telephone 14 is conferenced into call 100. Alternatively, this functionality could be supported only until an alert of the conference call is sent to cellular telephone 10, to avoid the confusion of announcing a conference call that is never connected.

Several alternate embodiments involve the switch that serves the landline telephone indicating to the user of the landline telephone that the conferencing process is being invoked. For example, SSP 24 may vary the dial tone provided to landline telephone 14 according to the progress of the conferencing process. First, SSP 24 may withhold an initial dial tone from landline telephone 14 to indicate to the user of landline telephone 14 that the inventive process is being applied. (If, at step 106, SCP system 32 processes the message about the off-hook status of landline telephone 14 and makes the determination that landline telephone 14 does not subscribe to the cellular-landline conference call service, SSP 24 could then deliver a normal dial tone to landline telephone 14.) Second, SSP 24 may provide landline telephone 14 with a distinct dial tone during the interval between step 106, when the conferencing process begins, and call 116, when the conference call is established. Both of these embodiments enable the user of the landline telephone to conveniently abort the conferencing process by simply beginning to dial an outbound call as described above.

One potential problem with the inventive process is that the call setup signaling at step 108 between SSP 24 and MSC 16 does not distinguish a dialed call from an automatically initiated conference call. For instance, the user of landline telephone 14 may want to normally initiate a call with cellular telephone 10 (i.e., the user of landline telephone 14 dials the number of cellular telephone 10) at a time when cellular telephone 10 is engaged in a call. According to the process as described in the exemplary operation section above, that dialed call would be joined into call 100 even though neither the user of cellular telephone 10 nor the user of landline telephone 14 intended to invoke the conferencing function.

To avoid this problem in accordance with an alternate embodiment of the invention, SCP system 32 may set a flag within subscription data 36 upon receipt of the off-hook status message at step 104. This flag is associated with landline telephone 14 and cellular telephone 10 and indicates that landline telephone 14 initiated the conferencing process by going off hook. When SCP system 32 subsequently receives the message at step 110 indicating that landline telephone 14 called cellular telephone 10, SCP system 32 may then access subscription data 36 as described above. However, only if the flag associated with the two telephone lines had been set would SCP system 32 send the message at step 112 indicating that landline telephone 14 should be joined into the existing call. Without that flag having been set, SCP system 32 would send instructions for MSC 16 to treat the incoming call from landline telephone 14 normally—i.e., MSC 16 could send a call waiting alert to cellular telephone 10 or send the incoming call into voicemail associated with cellular telephone 10. The flag would be reset when the conferencing process is completed or is otherwise ended so that subsequent calls involving landline telephone 14 could be handled properly.

(Alternately, the flag may indicate that the cellular telephone number has been dialed. In that case, only if the flag had not been set would SCP system 32 send the message at step 112 indicating that landline telephone 14 should be joined into the existing call. Correspondingly, SCP system 32 would send instructions for MSC 16 to treat the incoming call normally if the flag had been set, and the flag would be reset upon completion of normal treatment of the dialed call.)

Exemplary embodiments of the present invention have been described above. Those skilled in the art will understand, however, that changes and modifications may be made to the embodiments described without departing from the true scope and spirit of the present invention, which is defined by the claims.

What is claimed is:

1. A method comprising:

a network switch detecting transition of a landline telephone from an on-hook state to an off-hook state at a time when a call is not being placed to the landline telephone;

responsive to the detecting, determining by querying a subscription profile that is associated with the landline telephone that the subscription profile includes a subscription to a cellular-landline conference call service;

responsive to the determining, making a determination of whether a cellular telephone is currently engaged in a call, by querying a call-state database to determine call-state of the cellular telephone; and responsive to the determination being that the cellular telephone is currently engaged in a call, engaging in a conferencing process to conference the landline telephone into the call.

2. The method of claim 1, wherein the landline telephone is served by the network switch.

3. The method of claim 1, wherein the network switch comprises an entity selected from the group consisting of a public switched telephone network (PSTN) switch and a private branch exchange (PBX) server.

4. The method of claim 1, further comprising:

maintaining call-state data at the call-state database; and receiving a notification that the cellular telephone is currently engaged in a call, and responsively updating the call-state database to indicate that the cellular telephone is currently engaged in a call.

5. The method of claim 1, wherein engaging in the conferencing process to conference the landline telephone into the call comprises:

engaging in call signaling to set up a call between the landline telephone and the cellular telephone, and thereby joining the landline telephone into the call.

6. The method of claim 1, further comprising:

sending an alert to the cellular telephone to provide notice that a conference with the landline telephone is being invoked.

7. The method of claim 6, wherein the alert to the cellular telephone comprises an announcement audible to a user of the cellular telephone while the cellular telephone is engaged in the call.

8. The method of claim 6, further comprising:

receiving a message from the cellular telephone, and responsive to the received message, aborting the conferencing process.

9. The method of claim 1, wherein the landline telephone and the cellular telephone are co-owned.

10. The method of claim 1, further comprising:

completing the conferencing process, and then disengaging the cellular telephone from the call.

11. The method of claim 1, further comprising:

detecting digit dialing by the landline telephone, and responsive to the digital dialing, aborting the conferencing process.

12. A system comprising:

at least one processor;

memory; and machine language instructions stored in the memory and executable by the at least one processor: (i) to receive data identifying a transition of a landline telephone from an on-hook state to an off-hook state at a time when no call is being placed to the landline telephone, (ii) responsive to the receipt, to query a subscription profile that is associated with the landline telephone so as to determine that the subscription profile includes a subscription to a cellular-landline conference call service, (iii) responsive to the determining, to query a call-state database, and to thereby determine that a cellular telephone is currently engaged in a call, and (iv) responsive to determining that the cellular telephone is currently engaged in the call, to engage in a conferencing process to conference the landline telephone into the call.

13. The system of claim 12, wherein the machine language instructions are further executable by the at least one processor (i) to receive a message providing notification that the cellular telephone is currently engaged in the call, and (ii) responsive to the received message, to send current call-state data to the call-state database to indicate the cellular telephone is currently engaged in the call.

14. The system of claim 12, wherein the machine language instructions are further executable by the at least one processor to send an alert to the cellular telephone to provide notice that a conference with the landline telephone is being invoked.

15. The system of claim 14, wherein the alert to the cellular telephone comprises an announcement audible to a user of the cellular telephone while the cellular telephone is engaged in the call.

16. The system of claim 12, wherein the machine language instructions are further executable by the at least one processor to receive a message from the cellular telephone, and responsive to the received message, to abort the conferencing process.

17. The system of claim 12, wherein the machine language instructions are further executable by the at least one processor to complete the conferencing process, and then to disengage the cellular telephone from the call.

18. The system of claim 12, wherein the machine language instructions are further executable by the at least one processor to detect digit dialing by the landline telephone, and responsive to the digital dialing, to abort the conferencing process.

19. The system of claim 12, wherein the landline telephone and the cellular telephone are co-owned.

20. The system of claim 12, wherein the landline telephone is served by a network switch comprising an entity selected from the group consisting of a public switched telephone network (PSTN) switch and a private branch exchange (PBX) server.

* * * * *